United States Patent
Kemp

(10) Patent No.: US 11,748,221 B2
(45) Date of Patent: Sep. 5, 2023

(54) TEST ERROR SCENARIO GENERATION FOR COMPUTER PROCESSING SYSTEM COMPONENTS

(71) Applicant: International Business Machines Corporation, Armonk, NY (US)

(72) Inventor: Gregory A. Kemp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 17/462,354

(22) Filed: Aug. 31, 2021

(65) Prior Publication Data

US 2023/0065911 A1 Mar. 2, 2023

(51) Int. Cl.
*G06F 11/00* (2006.01)
*G06F 11/263* (2006.01)
*G06F 1/04* (2006.01)
*G06F 7/58* (2006.01)

(52) U.S. Cl.
CPC .............. *G06F 11/263* (2013.01); *G06F 1/04* (2013.01); *G06F 7/582* (2013.01)

(58) Field of Classification Search
CPC .............. G06F 11/263; G06F 11/0721; G06F 11/3024; G06F 11/26; G06F 1/04; G06F 7/582

See application file for complete search history.

(56) References Cited

U.S. PATENT DOCUMENTS

| | | | |
|---|---|---|---|
| 5,566,099 A * | 10/1996 | Shimada | H04L 9/12 708/250 |
| 7,404,110 B1 * | 7/2008 | Johnson | G06F 11/263 714/736 |
| 8,566,645 B2 | 10/2013 | Rentschler et al. | |
| 8,627,163 B2 | 1/2014 | Ito et al. | |
| 2004/0034820 A1 | 2/2004 | Soltis et al. | |
| 2004/0243882 A1 * | 12/2004 | Zhou | G06F 11/36 714/38.1 |
| 2016/0124825 A1 * | 5/2016 | Kunimitsu | G06F 11/076 714/33 |
| 2018/0196103 A1 | 7/2018 | Champoux et al. | |
| 2019/0033367 A1 | 1/2019 | Pappu et al. | |
| 2020/0125484 A1 * | 4/2020 | Yeggina | G06F 11/3688 |
| 2020/0319974 A1 | 10/2020 | Lacey et al. | |

* cited by examiner

*Primary Examiner* — Joseph D Manoskey
(74) *Attorney, Agent, or Firm* — Robert M. Sullivan

(57) ABSTRACT

A test stimulus generator generates error irritations, or error sequences, within a processor system. The test stimulus generator includes an initialization register, a pseudo-random number generator (PRNG), a clock subsystem, and an output register. The PRNG calculates an output value from an initialization value stored in the initialization register. The PRNG output value represents a unique error irritation and identifies one or more components within the processor system to handle the error irritation. The clock subsystem generates either a continuous or pulsed clock signal that transfers the initialization value into the PRNG. The output register stores the PRNG output value and transmits the corresponding error irritation to the processor components identified to handle the error irritation. The test stimulus generator generates error irritations in a predetermined or random order based on the initialization value. A corresponding method and computer program product are also disclosed.

18 Claims, 5 Drawing Sheets

TEST ERROR SCENARIO GENERATION FOR COMPUTER PROCESSING SYSTEM COMPONENTS

BACKGROUND

Field of the Invention

This invention relates generally to computer processing systems, and more particularly to systems and methods for generating error scenarios, or error irritations, and transmitting the error irritations to functional components within a computer processing system.

Background of the Invention

In the field of data processing systems, computer processing systems are designed to identify, handle, mitigate, and recover from errors. Errors can corrupt data by causing parity errors within a processor cache or memory. Errors can further cause a processor to execute instructions in an order that violates memory ordering rules, access an incorrect memory location, branch to an incorrect address location, or discard instructions from the instruction buffer incorrectly. Computer processing systems are designed to allow testing functions to inject errors into various logical components and to execute rare exception cases such that the error detection, correction, and recovery functions of the processor system can be verified.

Computer processing system testing mechanisms are designed to inject errors into the functional and control logic of the processor, cache, memory, controller, and adapter subsystems and components within the system. These testing mechanisms cause expected and unexpected errors, and exception scenarios, to occur within the computer processing system. The testing mechanisms further cause the error detection, correction, and recovery features of the computer processing system to be executed. It is important for the testing mechanisms to completely test the error capabilities of the computer processing systems within the engineering environment, such that the computer processing system designers can refine the system design before releasing the computer processing system to the public in various products.

Present testing designs include command and command sequences that inject specific errors into the processing system. A specific command or command sequence may cause a specific error to be injected into a specific processor logic component. Alternately, a command control word may be used to generate a range of errors based on the specific bit patterns in the control word. The command control word is then decoded to inject errors into specific processor logic components within the processing system. These present testing designs are limited in the range and complexity of error scenarios that can be injected into the processor system. Complex error scenarios often require multiple errors to occur simultaneously or within a fixed number of processor clock cycles. The present testing designs often cannot accommodate these stringent requirements.

In view of the foregoing, what are needed are systems and methods that improve computer processing system testing by generating and transmitting complex error and exception scenarios into the hardware, logic, control, and functional components of the computer processing system.

SUMMARY

The invention has been developed in response to the present state of the art and, in particular, in response to the problems and needs in the art that have not yet been fully solved by currently available systems and methods. The features and advantages of the invention will become more fully apparent from the following description and appended claims, or may be learned by practice of the invention as set forth hereinafter.

According to an embodiment of the invention described herein, a test stimulus generator generates complex error scenarios, or error irritations, within a computer processing system. In an embodiment, the test stimulus generator includes an initialization register, which receives an initialization value. In an embodiment, the test stimulus generator includes a pseudo-random number generator (PRNG), which calculates an output value from the initialization value. In an embodiment, the PRNG output value represents a unique error irritation, or complex error scenario, and identifies one or more components within the computer processing system to handle the error irritation. In an embodiment, the test stimulus generator includes a clock subsystem, which generates a clock signal that transfers the initialization value into the PRNG. In an embodiment, the clock subsystem generates either a continuous or pulsed clock signal. In an embodiment, the test stimulus generator includes an output register, which stores the PRNG output value and forwards, or transmits, the corresponding error irritation to the computer processing system components identified to handle the error irritation.

In an embodiment, the initialization value can be set to a predetermined value to cause the calculated PRNG output value to identify an error irritation and computer processing system components in a predetermined order. In an embodiment, the initialization value can be set alternatively to the previous PRNG output value to cause the calculated PRNG output value to identify an error irritation and computer processing system components in a random order. In an embodiment, each bit of the PRNG output value represents a unique error irritation and identifies one or more components within the computer processing system to handle the unique error irritation. In an embodiment, the PRNG output value includes a coded value, where each unique coded value represents a unique error irritation and identifies one or more computer processing system components to handle the unique error irritation. In an embodiment, the PRNG output value is divided into two subsets of bits, where each bit of one subset represents a unique error irritation, and the other subset of bits includes a coded value that identifies one or more computer processing components to handle the unique error irritations.

In an embodiment, a portion of the PRNG output values identifies central processing unit (CPU) components of the computer processing system and represents error irritations relating to the CPU components. In an embodiment, a portion of the PRNG output values identifies processor controller components of the computer processing system and represents error irritations relating to the processor controller components. In an embodiment, a portion of the PRNG output values identifies memory components of the computer processing system and represents error irritations relating to the memory components. In an embodiment, a portion of the PRNG output values identifies cache components of the computer processing system and represents error irritations relating to the cache components. In an embodiment, a portion of the PRNG output values identifies various adapter components of the computer processing system and represents error irritations relating to the various adapter components.

According to another embodiment of the invention described herein, a method for generating error irritations, or error scenarios, within a computer processing system includes receiving an initialization value into an initialization register within a test stimulus generator. In an embodiment, the method includes generating a clock signal using a clock subsystem within the test stimulus generator to transfer the initialization value to a pseudo-random number generator (PRNG) within the test stimulus generator. In an embodiment the method includes calculating an output value within the PRNG using the initialization value, where the PRNG output value represents a unique error irritation and identifies one or more components within the computer processing system to receive the unique error irritation. In an embodiment, the method includes transmitting the unique error irritation to the identified computer processing system components, thereby causing the unique error irritation to be handled by the one or more computer processing system components.

According to another embodiment of the invention described herein, a computer program product for generating error irritations, or error scenarios, within a computer processing system includes a non-transitory computer-readable storage medium having computer-usable program code embodied therein. In an embodiment, the computer-usable program code is configured to perform operations when executed by the at least one processor. In an embodiment, the computer program product operations include receiving an initialization value into an initialization register within a test stimulus generator. In an embodiment, the computer program product operations include generating a clock signal using a clock subsystem within the test stimulus generator to transfer the initialization value to a pseudo-random number generator (PRNG) within the test stimulus generator. In an embodiment, the computer program product operations include calculating an output value within the PRNG using the initialization value, where the PRNG output value represents a unique error irritation and identifies one or more components within the computer processing system to receive the unique error irritation. In an embodiment, the computer program product operations include transmitting the unique error irritation to the identified computer processing system components, thereby causing the unique error irritation to be handled by the one or more computer processing system components.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Exemplary embodiments of generating error scenarios, or error irritations, to test the error handling and error recovery of components within a computer processing system are described herein. A computer processing system includes one or more processors, a memory, a cache, and a plurality of components to perform computer processing functions and controls. The computer processing system also includes a testing module to test the error recovery features of the system components and to improve the quality and reliability of the computer processing system. The test module includes a test stimulus generator, which generates error signals, error scenarios, and/or error irritations and transmits the errors to the system components. The error irritations can include error scenarios that consist of one or more error signals relating to numerous computer processing system functions, such as errors in branch prediction, instruction prefetching, data prefetching, speculative execution of instructions along a predicted path, dataflow analysis for an out-of-order instruction execution, and many other scenarios. The error irritations can include also one or more errors relating to data corruption in a cache and/or memory location, parity errors in a cache and/or memory location, communication and/or data interruption within various interface and Input/Output (I/O) adapters, and other scenarios. The listing of these error irritations serve as exemplary error conditions to be handled within the computer processing system, and are not an exhaustive list of all the conditions that can be, or need to be, tested within the computer processing system.

Figure 1:
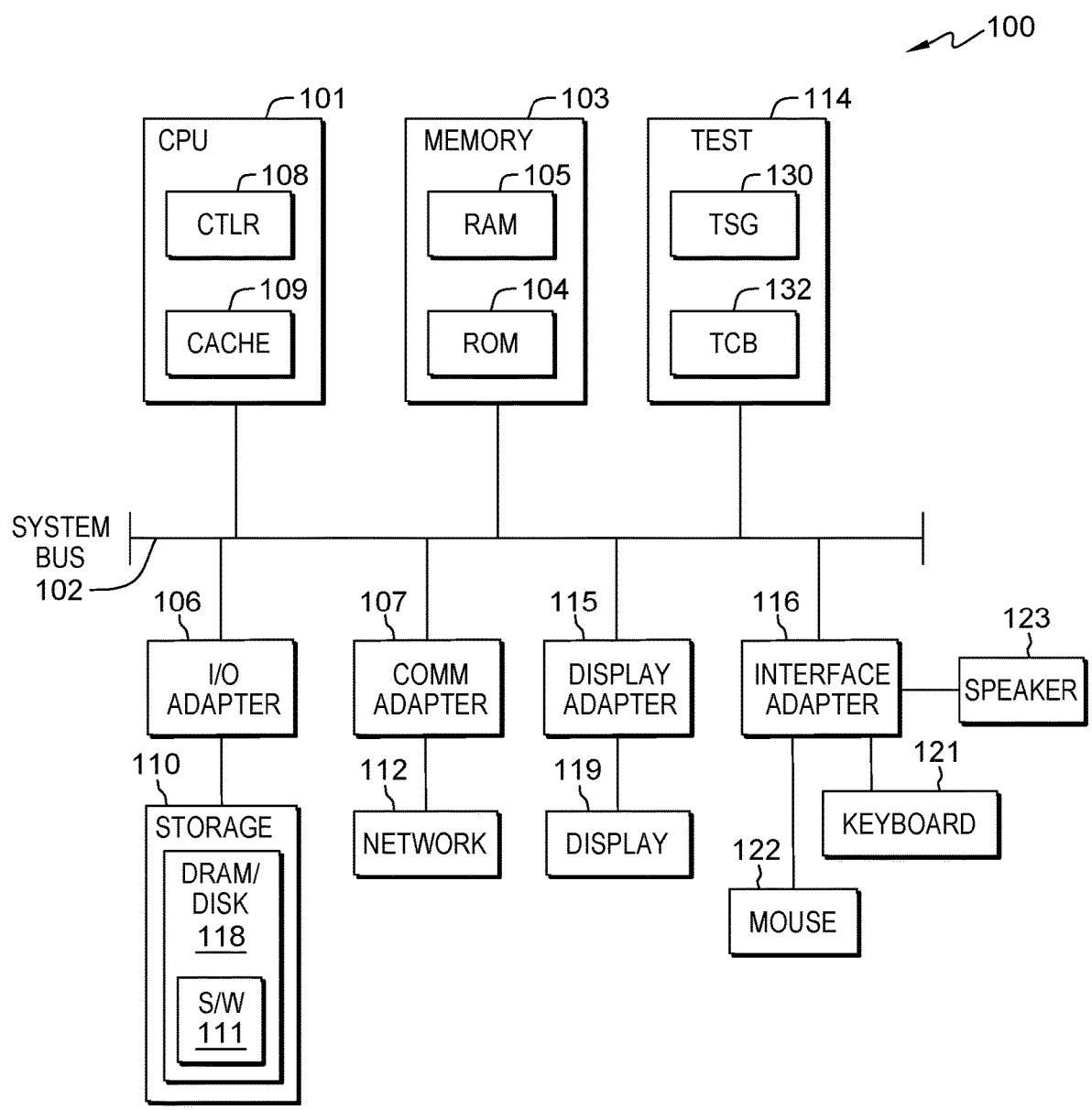
FIG. 1 is a high-level block diagram representing an example of a computer processing system, in which systems and methods in accordance with embodiments of the invention may be implemented.

Referring to FIG. 1, a computer processing system 100 is generally shown in accordance with an embodiment. The computer processing system 100 can be an electronic, computer framework comprising and/or employing any number and combination of computing devices and networks utilizing various communication technologies, as described herein. In certain embodiments, the computer processing system 100 can be easily scalable, extensible, and modular, with the ability to change to different services or reconfigure some features independently of others. In certain embodiments, the computer processing system 100 may be, for example, a server, desktop computer, laptop computer, tablet computer, or smartphone. In addition, the computer processing system 100 may be a cloud computing node. In certain embodiments, the computer processing system 100 may be described in the general context of computer system executable instructions, such as program modules, being executed by a computer system. In general, program modules may include routines, programs, objects, components, logic, data structures, and so on that perform particular tasks or implement particular abstract data types. In certain embodiments, the computer processing system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer processing system 100 has one or more central processing units (CPU(s)) 101 (collectively or generically referred to as processor(s) 101). In certain embodiments, the processors 101 can be a single-core processor, multi-core processor, computing cluster, or any number of other configurations. The processors 101, also referred to as processing circuits, may also include one or more accelerators (e.g., a graphics processing unit, or GPU). In an embodiment, the processor includes a cache 109 and a controller 108 to assist in perform processor-related functions, such as arithmetic and logic operations, program instruction execution, data transfers, and other processing system control and logic functions. In certain embodiments, the processors 101 are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. In certain embodiments, the system memory 103 provides temporary memory space for operations of said instructions during operation. The system memory 103 can include random access memory (RAM), read only memory, flash memory, or any other suitable memory systems.

In certain embodiments, the computer processing system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the flash memory (DRAM) 118 and/or hard disk drive 118 are collectively referred to herein as a mass storage 110. In certain embodiments, software 111 for execution on the computer processing system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail.

In an embodiment, the computer processing system 100 includes a test module 114 for generating errors, error scenarios, and error irritations and injecting them within the components of the computer processing system 100. The test module 114 includes test stimulus generator 130 and a test control block 132. In an embodiment, the test stimulus generator 130 calculates randomized output values from initialization values that represent error irritations and identify specific components within the computer processing system 100 to handle the error irritations. The test control block 132 receives test-related command words and converts the command words into error irritations specified for particular components within the computer processing system 100. The test module 114 connects to the system bus 102 to transmit error irritations to the computer processing system 100 components. The test module 114 provides a mechanism to test the components, logic, and functional units of the CPUs 101, the cache 109, the controller 108, the memory 103, the mass storage 110, and the various adapters 106, 107, 115, 116 within the computer processing system. The test module 114 can comprise logic components, firmware, software, or combinations thereof.

In certain embodiments, the communications adapter 107 interconnects the system bus 102 with a network 112, which may be an outside network, enabling the computer processing system 100 to communicate with other systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

In certain embodiments, additional input/output devices are connected to the system bus 102 via a display adapter 115 and an interface adapter 116. In an embodiment, the adapters 106, 107, 115, and 116 may be connected to one or more I/O buses that are connected to the system bus 102 via an intermediate bus bridge (not shown). In an embodiment, a display 119 (e.g., a display screen or monitor) is connected to the system bus 102 through a display adapter 115, which may include a graphics controller to improve the performance of graphics intensive applications and a video controller. In an embodiment, a keyboard 121, a mouse 122, a speaker 123, and/or other devices can be interconnected to the system bus 102 via the interface adapter 116, which may include, for example, a Super I/O chip integrating multiple device adapters into a single integrated circuit. In certain embodiments, suitable I/O buses for connecting peripheral devices such as hard disk controllers, network adapters, and graphics adapters typically include common protocols, such as the Peripheral Component Interconnect (PCI). Thus, as configured in FIG. 1, the computer processing system 100 includes processing capability in the form of the processors 101, and, storage capability including the system memory 103 and the mass storage 110, input means such as the keyboard 121 and the mouse 122, and output capability including the speaker 123 and the display 119.

In certain embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some embodiments, an external computing device may be an external webserver or a cloud computing node.

It is to be understood that the block diagram of FIG. 1 is not intended to indicate that the computer processing system 100 is to include all of the components shown in FIG. 1.

Rather, the computer processing system 100 can include any appropriate fewer or additional components not illustrated in FIG. 1 (e.g., additional memory components, embedded controllers, modules, additional network interfaces, etc.). Further, the embodiments described herein with respect to computer processing system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
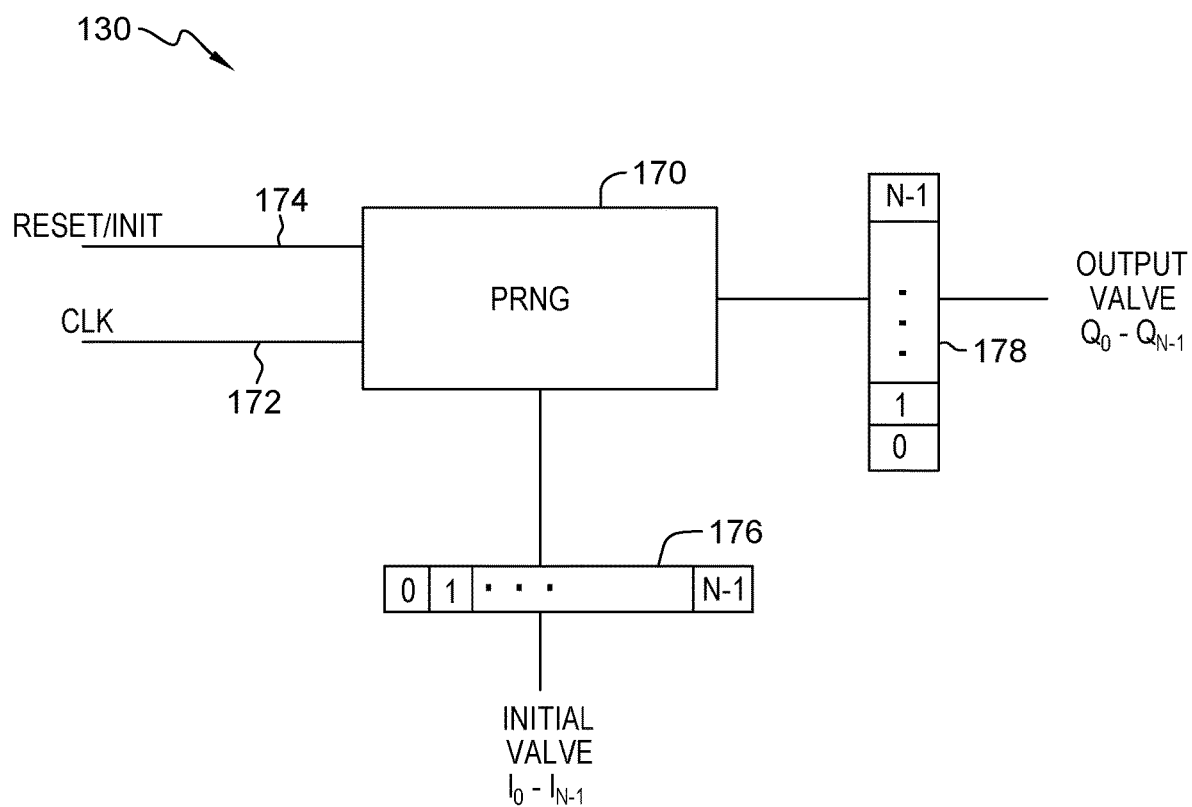
FIG. 2 is a high-level block diagram representing a test stimulus generator for improving error irritation generation and injection within a computer processing system, in accordance with an embodiment of the invention.

FIG. 2 represents a block diagram of a test stimulus generator 130 within the test module 114, in accordance with an embodiment of the present invention. In an embodiment, the test stimulus generator includes a pseudo-random number generator (PRNG) 170 coupled to an initialization register 176 and an output register 178. The PRNG 170 receives an initialization signal 174 and clock signal 172 as inputs. In an embodiment, the PRNG 170 receives the initialization value from the initialization register 176 when the initialization signal 174 and the clock signal 172 are both active. The PRNG 170 calculates a randomized output value from the initialization value and stores the output value in the output register 178. In an embodiment, the PRNG 170 receives as its input the output value 178 from the previous clock signal 172, when the next clock signal 172 is active and the initialization signal 174 is not active. In an embodiment, the PRNG output value stored in the output register 178 represents a unique error irritation and identifies one or more components within the computer processing system to handle the error irritation. The error irritation is transmitted to the identified computer processing system 100 components from the output register 178.

In an embodiment, the initialization register 176 and the output register 178 may be of such length as needed to identify all the computer processing system 100 components and represent all the error irritations unique to the components. In an embodiment, the clock signal 172 can one or more continuous running clock signals having certain time intervals between active and inactive states, or a pulsed clock signal becoming active for a short duration only when certain criteria are met. In an embodiment, the PRNG 170 can include discrete logic components to calculate randomized output values, or it can include firmware or software to calculate the randomized values, or it can include a combination of logic, firmware, and software.

Figure 3:
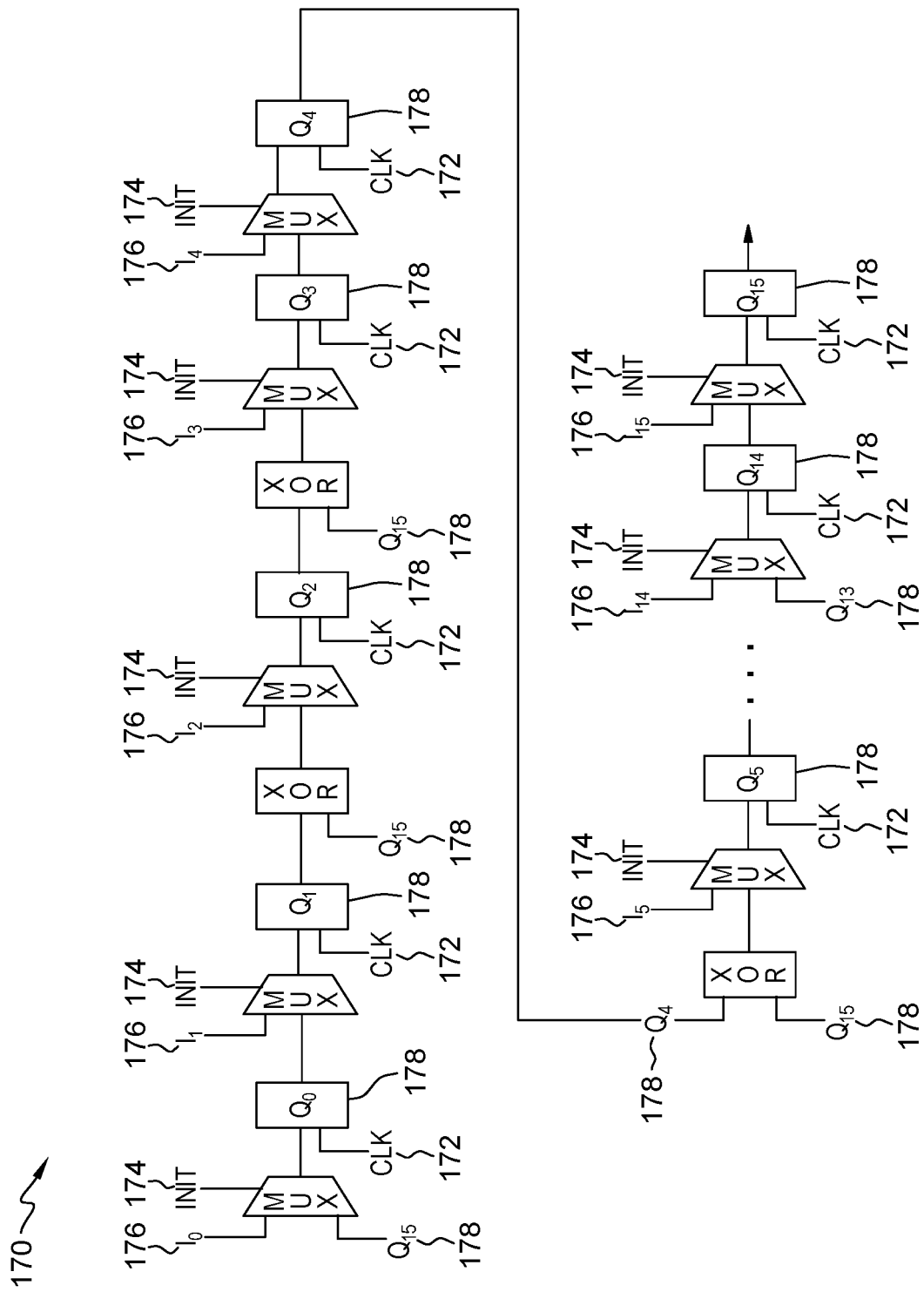
FIG. 3 is a high-level block diagram representing a pseudo random number generator (PRNG) component of the test stimulus generator for improving error irritation generation and injection within a processing system, in accordance with an embodiment of the invention.

FIG. 3 represents a block diagram of an example of a PRNG 170 within the test stimulus generator 130 in accordance with an embodiment of the present invention. FIG. 3 includes discrete logic components, and represents only one example of a PRNG 170 and is not meant to limit the scope of the invention. In an embodiment, the PRNG 170 includes N latches (16 in this example) to hold the N bits of the output register 178 (Q0-Q15). The PRNG 170 includes N multiplexers, each multiplexer receives as inputs one bit of the initialization register 176 (I0-I15) and a previous bit of the output register 178 (Q0-Q15). In an embodiment, the multiplexer selects either the initialization register bit 176 or the previous output register bit 178 based on whether the initialization signal 174 is active. A clock signal 172 controls when the output from the multiplexer is latched into the output register 178 bit. In an embodiment, the output register 178 bit Q1 is logically combined (in this case XORed) with output register 178 bit Q15 to form one of the inputs to the multiplexer for output register 178 bit Q2. Likewise, this same combinational logic is repeated for output register 178 bits Q3 and Q5. Using such combinational logic creates a pseudo-random output for the PRNG 170.

In an embodiment, the PRNG 170 could comprise firmware or software to calculate pseudo-random output values 178 from initialization values 176, whether the initialization values 176 are pre-determined or simply the previously calculated output value 178. An algorithm for performing these calculations can be generated in firmware or software, as most algorithms comprise logical or arithmetic operations to calculate a pseudo-random output from an input. The present invention utilizes a pseudo-random number generator, or a pseudo-random algorithm or process, because output values can be reproduced based on select input, or initialization, values. As such, the present invention can generate select error irritations, or error scenarios, by setting specified initialization values. Whereas, a random number generator, or a random process, is less desirable because select output values that represent select error irritations cannot be reproduced based on a specified initialization value. In sum, FIG. 3 represents only an exemplary way to implement a PRNG 170, and it is not meant to teach the sole implementation of a PRNG 170 for the present invention.

As stated previously, the PRNG 170 output value stored in the output register 178 represents a unique error irritation and identifies one or more components within the computer processing system 100 to receive and handle the error irritation. In an embodiment, the PRNG output value in the output register 178 is transmitted within the computer processing system 100 along the system bus 102 when the clock signal 172 is activated. The components identified in the PRNG output value 178 receive the unique error irritation included in the PRNG output value 178 and instigate error handling and error recovery procedures within the computer processing system 100 components. In an embodiment, the PRNG 170 within the test stimulus generator 130 calculates a new output value when it receives a next clock signal 172. The new PRNG 170 output value 178 represents a new error irritation to be handled by new (and possibly different) components within the computer processing system 100. Thus, the present invention improves the testing features of a computer processing system 100 by generating and transmitting multiple error irritations, or error scenarios, within the computer processing system 100 in a pseudo-random pattern at potentially very short time intervals.

In an embodiment, each bit of the output value stored in the output register 178 represents a unique error irritation within the computer processing system 100, and is transmitted to the one or more components within the computer processing system 100 for handling. As such, multiple error irritations, or error scenarios, can be transmitted to multiple computer processing system components concurrently. In another embodiment, the bits of the output value stored in the output register 178 represent a coded word, where each value corresponds to a unique error irritation to be handled by one or more components within the computer processing system 100. In another embodiment, the output value stored in the output register 178 is divided into two portions, where a subset of bits describes a coded word that represents the unique error irritation and another subset of bits describes a coded word that identifies one or more components within the computer processing system 100 to handle the error irritation. In another embodiment, the output value stored in the output register 178 is divided into two portions, where each bit of a subset of bits represents a unique error irritation, or error scenario, and the other subset of bits describes a coded word that identifies the one or more computer processing system 100 components to handle the error irritation. As such, multiple error irritations can be transmitted concurrently to one or more computer processing system 100 components.

Figure 4:
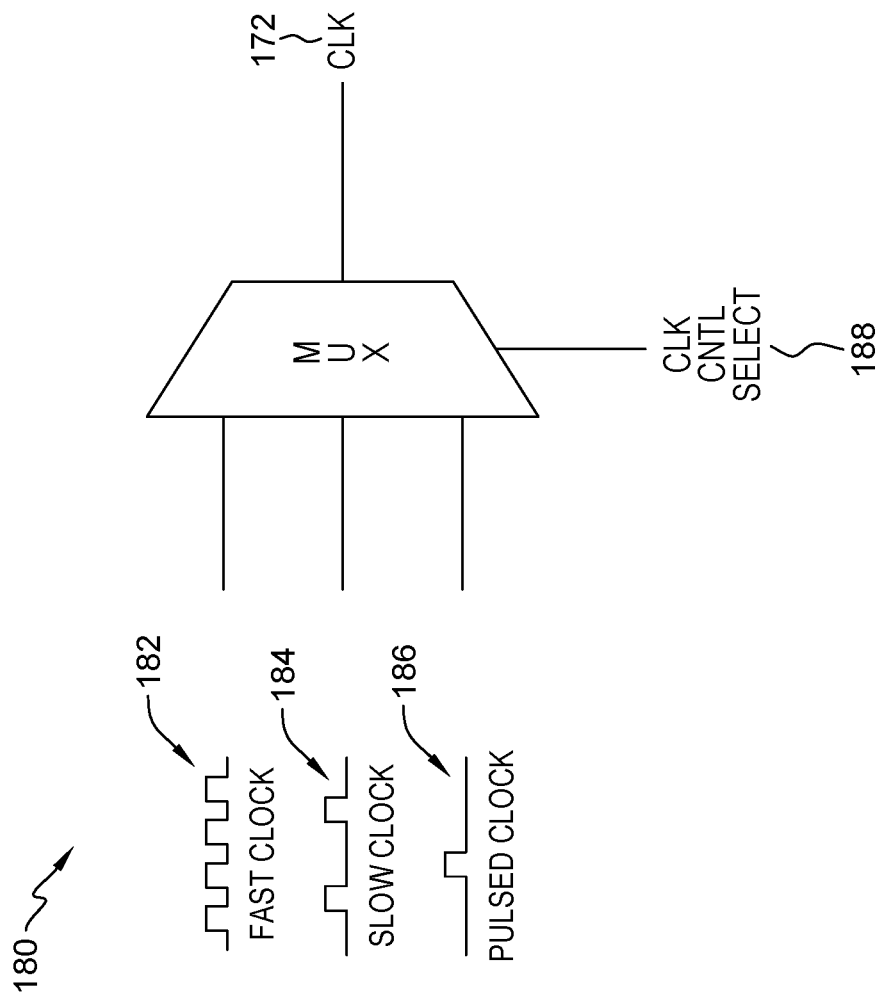
FIG. 4 is a high-level block diagram representing a clock control for the PRNG component of the test stimulus generator for improving error irritation generation and injection within a processing system, in accordance with an embodiment of the invention.

FIG. 4 represents a block diagram of a clock subsystem 180 in accordance with an embodiment of the present invention. In an embodiment, the clock subsystem 180 includes a multiplexer having multiple clock signals 182, 184, 186 and a clock select signal 188 as inputs. The multiplexer selects one of the clock signal inputs 182, 184, 186 as the output clock signal 172 to be used by the PRNG 170 within the test stimulus generator 130, when the clock select signal is activated. In an embodiment, FIG. 4 includes a continuous running clock signal at a faster interval 182, a continuous running clock signal at a slower interval 184, and a pulsed clock signal 186. These clock signals 182, 184, 186 provide examples of clock signals that could be used in the clock subsystem 180, and are not intended to be limiting the scope of the invention. In an embodiment, the clock select signal 188 selects which input clock signal 182, 184, 186 is to be used as the clock subsystem 180 clock signal 172 for the test stimulus generator. The selected clock signal 172 remains active until a new clock select signal 188 is received.

Figure 5:
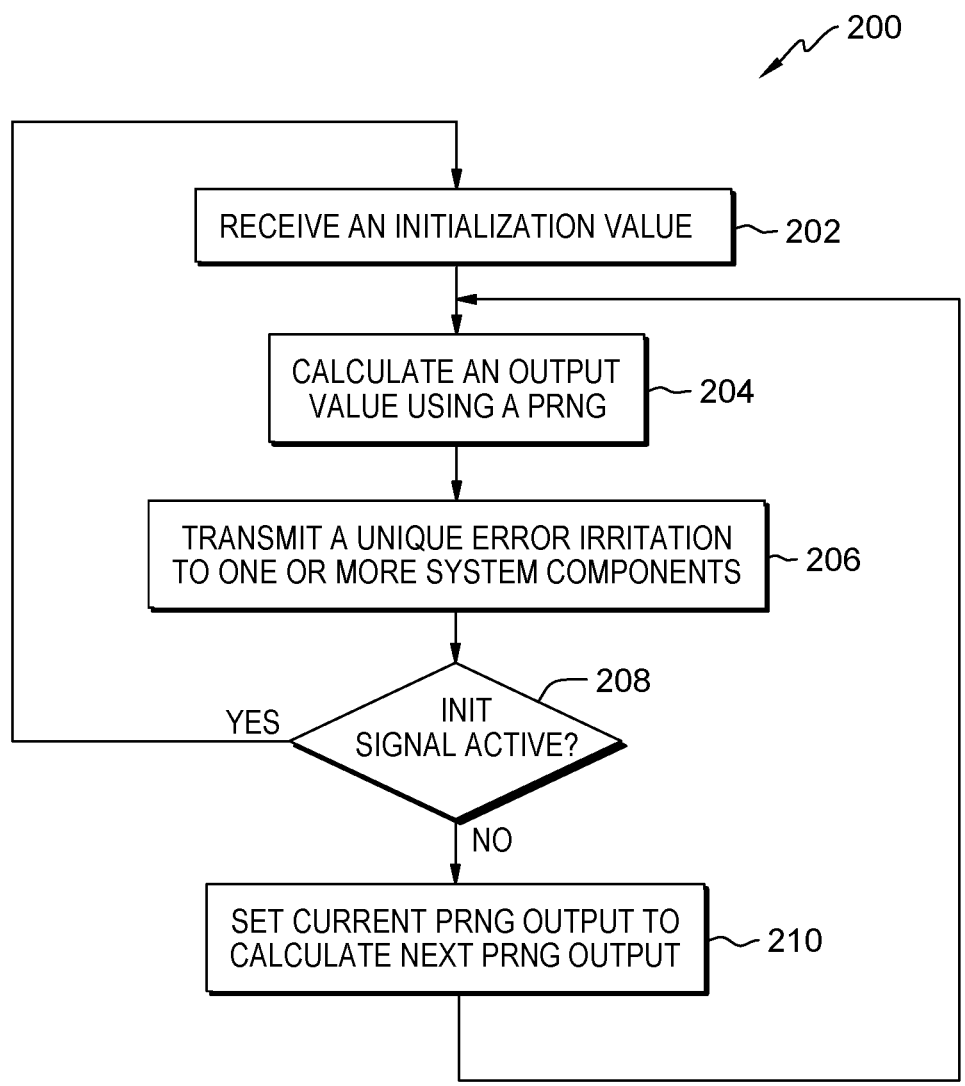
FIG. 5 is a flow diagram representing an embodiment of an improved computer-implemented method for generating and injecting error irritation scenarios into a computer processing system.

FIG. 5 represents a flow diagram of a computer-implemented method 200 for generating and transmitting error irritations within a computer processing system 100, in accordance with an embodiment of the present invention. In an embodiment, the method 200 receives at method step 202 an initialization value 176 within the test stimulus generator 130. In an embodiment, the method 200 calculates at method step 204 an output value 178 within the test stimulus generator 130 using a pseudo-random number generator (PRNG) 170 and the initialization value 176. The PRNG output value 178 represents a unique error irritation, or error scenario, and identifies one or more computer processing system 100 components to handle the error irritation. In an embodiment, the method 200 transmits at method step 206 the unique error irritation, or error scenario, from the test stimulus generator 130 to the one or more computer processing system 100 components identified by the PRNG output value 178. In an embodiment, the method 200 determines at step 208 whether the initialization signal 174 is active within the test stimulus generator 130. If so, the method 200 transfers control to method step 202 to receive a new initialization value 176 within the test stimulus generator 130. In this case, the method 200 is calculating a PRNG output value 178 that represents an error irritation in a pre-determined order. If not, the method 200 uses at method step 210 the current PRNG output value 178 as the input to the PRNG 130 and transfers control to method step 204 to calculate a new PRNG output value 178. In this case, the method 200 calculates a PRNG output value 178 that represents an error irritation in a random order.

As stated previously, testing mechanisms in computer processing systems improve the quality and reliability of such systems, and reduces the cost of product development. The present invention generates complex error scenarios, or error irritations, and transmits these error irritations to multiple components within the computer processing system. The error irritations can consist of multiple errors that are handled concurrently by multiple components. The present invention generates the error irritations in a pre-determined order using an initialization value that causes a specific error irritation. The present invention also generates error irritations in a random order using a randomly generated output value from a pseudo-random number generator to create a random error irritation to be handled by multiple computer processing system components. The present invention also generates error irritations subsequent to one another at clock cycle speeds with a continuous running clock, further increasing the test capabilities within the computer processing system.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed:

1. A test stimulus generator for generating a plurality of error irritations, or error scenarios, within a computer processor system, the computer processing system including a central processing unit (CPU), a memory, a cache, and a plurality of components to perform computer processing system functions, the test stimulus generator comprising:
   an initialization register for storing an initialization value received by the test stimulus generator;
   a pseudo-random number generator (PRNG) for calculating an output value from the initialization value, wherein the PRNG output value represents a unique error irritation from the plurality of error irritations and identifies one or more components within the computer processing system to receive the unique error irritation; and
   an output register for storing the PRNG output value and for transmitting the unique error irritation to the one or more identified components within the computer processing system, thereby causing the unique error irritation to be handled by the one or more identified components within the computer processing system, wherein each bit of the PRNG output value represents a separate unique error irritation and identifies the one or more computer processing system components to receive the separate unique error irritation.

2. The test stimulus generator of claim 1, further comprising:
   a clock subsystem for generating a clock signal, wherein the PRNG receives the initialization value from the initialization register when the clock subsystem generates the clock signal.

3. The test stimulus generator of claim 2, wherein the clock subsystem can generate either a continuous running clock signal or a pulsed clock signal.

4. The test stimulus generator of claim 1, wherein the initialization value is set to a predetermined value to cause the PRNG output value to represent a predetermined error irritation and identify the one or more computer processing system components in a predetermined order.

5. The test stimulus generator of claim 1, wherein the initialization value is the PRNG output value from a previous clock signal, and wherein the PRNG output value from the present clock signal represents a randomly selected error irritation and identifies the one or more computer processing system components in a random order.

6. The test stimulus generator of claim 1, wherein a first set of bits of the PRNG output value includes a coded value that represents the unique error irritation, and wherein a second set of bits of the PRNG output value includes a coded value that identifies the one or more computer processing system components to receive the unique error irritation.

7. The test stimulus generator of claim 1, wherein each bit of a first set of bits of the PRNG output value represents a separate unique error irritation, and wherein a second set of bits of the PRNG output value includes a coded value that identifies the one or more computer processing system components to receive the separate unique error irritation.

8. A method for generating a plurality of error irritations, or error sequences, within a computing processing system, the computer processing system having at least one processor (CPU), a memory, a cache, and a plurality of components to perform computer processing system functions, the computer processing system further including a computer-readable storage medium having computer-usable program code embodied therein, the computer-usable program code configured to perform operations when executed by the at least one processor, the method comprising:
  generating an initialization value to be inputted into a test stimulus generator, wherein the test stimulus generator includes a pseudo-random number generator (PRNG);
  calculating an output value within the PRNG using the initialization value, wherein the PRNG output value represents a unique error irritation from the plurality of error irritations and identifies one or more select components within the computer processing system to receive the unique error irritation; and
  transmitting the unique error irritation to the one or more select components within the computer processing system, thereby causing the unique error irritation to be handled by the one or more select components within the computer processing system, wherein each bit of the PRNG output value represents a separate unique error irritation and identifies the one or more computer processing system components to receive the separate unique error irritation.

9. The method of claim 8, further comprising:
  generating a clock signal from a clock subsystem within the test stimulus generator to transfer the initialization value into the pseudo-random number generator.

10. The method of claim 9, wherein the clock subsystem within the test stimulus generator can generate either a continuous running clock signal or a pulsed clock signal.

11. The method of claim 8, wherein the initialization value to the test stimulus generator is set to a predetermined value to cause the PRNG output value to represent a predetermined error irritation and identify the one or more computer processing system components in a predetermined order.

12. The method of claim 8, wherein the initialization value to the test stimulus generator is the PRNG output value from a previous clock signal, and wherein the PRNG output value from the present clock signal represents a randomly selected error irritation and identifies the one or more computer processing system components in a random order.

13. The method of claim 8, wherein a first set of bits of the PRNG output value includes a coded value that represents the unique error irritation, and wherein a second set of bits of the PRNG output value includes a coded value that identifies the one or more computer processing system components to receive the unique error irritation.

14. The method of claim 8, wherein each bit of a first set of bits of the PRNG output value represents a separate unique error irritation, and wherein a second set of bits of the PRNG output value includes a coded value that identifies the one or more computer processing system components to receive the separate unique error irritation.

15. A computer program product for generating a plurality of error irritations, or error sequences, within a processor system, the processor system having at least one processor (CPU), a memory, a cache, and a plurality of components to perform computer processing system functions, the computer program product comprising a non-transitory computer-readable storage medium having computer-usable program code embodied therein, the computer-usable program code configured to perform operations when executed by the at least one processor, the operations comprising:
  generating an initialization value to be inputted into a test stimulus generator, wherein the test stimulus generator includes a pseudo-random number generator (PRNG);
  generating a clock signal from a clock subsystem within the test stimulus generator to transfer the initialization value into the pseudo-random number generator (PRNG) process;
  calculating an output value within the PRNG using the initialization value, wherein the PRNG output value represents a unique error irritation from the plurality of error irritations and identifies one or more select components within the computer processing system to receive the unique error irritation; and
  transmitting the unique error irritation to the select component within the processor system, thereby causing the unique error irritation to be handled by the one or more select components within the computer processing system, wherein each bit of the PRNG output value represents a separate unique error irritation and identifies the one or more computer processing system components to receive the separate unique error irritation.

16. The computer program product of claim 15, wherein the initialization value to the test stimulus generator is set to a predetermined value to cause the PRNG output value to represent a predetermined error irritation and identify the one or more computer processing system components in a predetermined order.

17. The computer program product of claim 15, wherein the initialization value to the test stimulus generator is the PRNG output value from a previous clock signal, and wherein the PRNG output value from the present clock signal represents a randomly selected error irritation and identifies the one or more computer processing system components in a random order.

18. The computer program product of claim 15, wherein the clock subsystem within the test stimulus generator can generate either a continuous running clock signal or a pulsed clock signal.

* * * * *